United States Patent
Toyoda

(10) Patent No.: US 6,858,765 B2
(45) Date of Patent: Feb. 22, 2005

(54) POLYOLEFIN WAX FOR COATING MATERIALS AND PRINTING INK COMPOSITION

(75) Inventor: Hideo Toyoda, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/278,031

(22) Filed: Oct. 23, 2002

(65) Prior Publication Data

US 2003/0171481 A1 Sep. 11, 2003

(30) Foreign Application Priority Data

Oct. 31, 2001 (JP) ........................................ 2001-334636
Dec. 17, 2001 (JP) ........................................ 2001-383285

(51) Int. Cl.$^7$ ................................................. C07C 2/06
(52) U.S. Cl. ............................... 585/9; 585/10; 585/12; 585/511; 585/512; 526/160; 526/161; 526/943
(58) Field of Search ............................... 585/9, 10, 12, 585/511, 512; 526/160, 161, 943

(56) References Cited

U.S. PATENT DOCUMENTS 6,080,902 A * 6/2000 Herrmann et al. .......... 585/512

OTHER PUBLICATIONS

Cremer et al., Chemical Engineering Practice, vol. 3 Solid Systems, 1957, pp 8–12, Butterworths Scientific Publications, London, UK.

Rawle, "Basic Principles of Particle Size Analysis," Technical Paper, downloaded from Malvern Instruments website @ www.malvern.co.uk, 2003.

* cited by examiner

Primary Examiner—Robert D. Harlan
(74) Attorney, Agent, or Firm—Burns, Doane, Swecker & Mathis, LLP

(57) ABSTRACT

A polyolefin wax for a coating material which includes an ethylene (co)polymer having a number-average molecular weight within the range of from 400 to 5000 as measured by gel permeation chromatography. The polyolefin wax has a volume average particle diameter in the range of from 0.3 $\mu$m to 20 $\mu$m wherein the relation between a particle diameter a ($\mu$m), in which the weight ratio of the large particle diameter side in weight particle-size distribution is 10%, and a particle diameter b ($\mu$m), in which the weight ratio of the small particle diameter side in weight particle size distribution is 10%, satisfies the a/b$\leq$4 and the relation between the crystallization temperature Tc (° C.), measured at a cooling rate of 2° C./min) as measured by differential scanning calorimetry (DSC) and the density D (kg/m$^3$) as measured by the density gradient tube method satisfies the equation 0.501×D−366$\geq$Tc. A printing ink composition the polyolefin wax and an liquid dispersion containing particles of an ethylene polymer composition are also set forth.

4 Claims, No Drawings

POLYOLEFIN WAX FOR COATING MATERIALS AND PRINTING INK COMPOSITION

BACKGROUND OF THE INVENTION

1. Field of the Invention

The present invention relates to polyolefin waxes used as coating materials and printing ink compositions, for example, a polyolefin wax suitable for use in printing inks and a printing ink composition containing such a polyolefin wax.

The present invention also relates to ethylene polymer composition dispersions and the use thereof, more specifically, ethylene polymer composition aqueous dispersions wherein particles of ethylene polymer composition are dispersed in water, printing ink additives comprising such aqueous dispersions, printing ink additives comprising the aforesaid particles, ethylene polymer composition organic solvent dispersions in which the aforesaid particles are dispersed in a hydrocarbon solvent, and printing ink additives comprising such organic solvent dispersions.

2. Description of the Related Art

Generally, waxes are used as additives in coating materials such as printing inks for purposes such as an improvement of abrasion resistance, reduction of tackiness, prevention of blocking, and improvements of water resistance and water repellency of the printed film. Here, "wax" is used as a generic term for organic compounds that are mainly composed of aliphatic constituents and are solid at room temperature but melt to become a low-viscosity fluid when heated.

Heretofore, known examples of waxes used in printing inks, such as inks for planographic printing and offset printing, include carnauba wax, beeswax, paraffin wax, microcrystalline wax, polyethylene wax, polypropylene wax, fatty acid amides, polytetrafluoroethylenes and so on. When a wax is used in a printing ink, the abrasion resistance is improved by the effect of wax particles present on the surface of the printed film made of the printing ink. This is due to the fact that the wax particles partly protruding outward from the ink surface is crushed by external physical pressure, spreads thinly on the ink coating formed on paper or various types of film material, and protects the ink surface.

Since the wax blended into the printing ink must be blended uniformly into the printing ink, various methods are known, for example, a method in which a pulverized wax is used, a method in which a solid wax is kneaded into the ink, and a method in which a wax is dispersed in an oil or water. It should be noted, however, that with the conventional solid waxes, the surface of the printed ink in which the wax is blended has significant unevenness, which makes it impossible to obtain a clear printed image, and unless a large amount of the wax is blended into the printing ink, the desired effects cannot be obtained.

Water-based inks have been widely used in the past as inks for printing on materials such as cardboard. Since they have low abrasion resistance when they consist only of the principal constituent resin, waxes are usually added to improve the abrasion resistance. The present inventors have already proposed an aqueous dispersion of a low-molecular-weight polyolefin, which does not contain any low-molecular-weight surfactants, for such uses (see JP-A Sho 58-42207, JP-A Hei 5-156028).

Nevertheless, in recent years, as seen in offset rotary printing inks, methods in which the print matter is dried at a high temperature have become widespread. On the other hand, from the viewpoint of improving abrasion resistance, moderately soft waxes exhibit good performances, since they are easily crushed on the surface of the ink layer. In use of conventional aqueous dispersions of waxes, due to softening of the waxes, insufficient blocking resistance resulting from increased tackiness of the wax has achieved. Therefore it has been desired to realize a combination of sufficient abrasion resistance and sufficient blocking resistance even after high-temperature drying.

In oil-based printing inks, on the other hand, due to restrictions on the use of solvents related to environmental concerns, organic solvents that do not contain toluene, such as alcohols, ethyl acetate and aliphatic hydrocarbons, have been used as the dispersion solvents for waxes. However, waxes are poor solvents that are difficult to dissolve in these solvents. Therefore so-called crystallization methods, wherein the wax is once solubilized at a high-temperature and a crystallized product is obtained by cooling or by adding a poor solvent, have been difficult to apply.

BRIEF SUMMARY OF THE INVENTION

The present invention can provide a polyolefin wax for a coating material, particularly a polyolefin wax that is suitable for use as an additive for printing inks and can simultaneously improve the abrasion resistance and the blocking resistance of the ink, and a printing ink composition containing such wax.

The present invention can also provide an ethylene polymer composition aqueous dispersion in which particles of an ethylene polymer composition are dispersed in water, a printing ink additive comprising such aqueous dispersion, a printing ink additive comprising the aforesaid particles, an ethylene polymer composition organic solvent dispersion in which the aforesaid particles are dispersed in a hydrocarbon solvent, and a printing ink additive comprising such organic dispersion, so as to provide ink with a combination of excellent abrasion resistance and blocking resistance.

The various aspects of the present invention are provided as follows. (1) A polyolefin wax (B) for a coating material, comprising an ethylene (co)polymer (A), wherein the number-average molecular weight (Mn) is within the range of from 400 to 5000 as measured by gel permeation chromatography (GPC), the mean volume particle diameter is in the range of from 0.3 $\mu$m to 20 $\mu$m, the relation between a particle diameter a ($\mu$m), in which the weight ratio of the larger particle diameter side in weight particle-size distribution is 10%, and a particle diameter b ($\mu$m), in which the weight ratio of the smaller particle diameter side in weight particle-size distribution is 10%, satisfies the following equation (I):

$$a/b \leq 4 \qquad (I),\text{ and}$$

the relation between the crystallization temperature (Tc (° C.), measured at a cooling rate of 2° C./min) as measured by differential scanning calorimetry (DSC) and the density (D (kg/m$^3$)) as measured by the density gradient tube method satisfies the following equation (II):

$$0.501 \times D - 366 \geq Tc \qquad (II).$$

(2) The polyolefin wax (B) for a coating material according to (1) above, wherein the aforesaid ethylene (co)polymer (A) is an ethylene.α-olefin copolymer obtained from ethylene and propene and/or 1-butene, and the density of (A) is in the range of from 850 kg/m³ to 980 kg/m³.

(3) The polyolefin wax (B) for a coating material according to either (1) or (2) above, wherein the aforesaid ethylene (co)polymer (A) is manufactured using a vanadium catalyst or a metallocene catalyst.

(4) A printing ink composition, which comprises from 0.1 to 10 weight % of the polyolefin wax (B) for a coating material according to any one of (1) through (3) above.

Additional aspects of the present invention provide the following ethylene polymer composition aqueous dispersions, ethylene polymer composition organic solvent dispersions and printing ink additives:

(1) An ethylene polymer composition aqueous dispersion, wherein particles of an ethylene polymer composition comprise:

(A) an ethylene polymer which is an ethylene homopolymer or an ethylene/α-olefin copolymer, in which the number-average molecular weight (Mn) is within the range of from 400 to 8000 as measured by gel permeation chromatography (GPC), Mn/Mw is no greater than 4, and the relation between the crystallization temperature (Tc (° C.), measured at a cooling rate of 2° C./min) as measured by differential scanning calorimetry (DSC) and the density (D (kg/m³)) as measured by the density gradient tube method satisfies the following equation (II):

$$0.501 \times D - 366 \geq Tc \quad \text{(II)}$$

and (C) a modified ethylene polymer which is a modified ethylene polymer obtained by modifying an ethylene homopolymer or an ethylene/α-olefin copolymer with an unsaturated carboxylic acid or a derivative thereof or a sulfonate, in which the amount of modification by the unsaturated carboxylic acid or the derivative thereof, defined by KOH titration is from 30 to 100 mg KOH per 1 g of modified polymer, and the amount of modification by the sulfonate is from 0.1 to 50 mmol, in an amount of —SO$_3$—, per 1 g of modified polymer, are dispersed in water.

(2) The ethylene polymer composition aqueous dispersion according to (1) above, wherein the aforesaid ethylene polymer (A) is synthesized using a metallocene catalyst.

(3) The ethylene polymer composition aqueous dispersion according to (1) or (2) above, wherein (A/C), the weight ratio of the aforesaid ethylene polymer (A) to the aforesaid modified ethylene polymer (C) is in the range of from 95/5 to 50/50.

(4) The ethylene polymer composition aqueous dispersion according to any one of (1) through (3) above, wherein the density of said ethylene polymer (A) according to the density gradient tube method is in the range of from 850–980 kg/m³, and the mean volume particle diameter of the ethylene polymer composition is in the range of from 0.1 to 20 μm.

(5) A printing ink additive comprising the ethylene polymer composition aqueous dispersion according to any of (1) through (4) above.

(6) A printing ink additive comprising the particles of the ethylene polymer composition according to any of (1) through (4) above.

(7) An ethylene polymer composition organic solvent dispersion in which the particles of the ethylene polymer composition according to any one of (1) through (4) above are dispersed in a hydrocarbon solvent.

(8) A printing ink additive comprising the ethylene polymer composition organic solvent dispersion according to (7) above.

DETAILED DESCRIPTION OF THE INVENTION

The polyolefin wax for a coating material and the printing ink composition of the present invention are specifically explained below.

Polyolefin Wax for Coating Material.

The polyolefin wax for a coating material (B) according to the present invention comprises a specific ethylene (co) polymer.

The ethylene (co)polymer (A) used in the present invention is an ethylene homopolymer or a copolymer of ethylene and an α-olefin or more than one α-olefin.

Examples of the α-olefin include propene, which has 3 carbon atoms, 1-butene, which has 4 carbon atoms, 1-pentene, which has 5 carbon atoms, 1-hexene and 4-methyl-1-pentene, which has 6 carbon atoms, 1-octene, which has 8 carbon atoms and so on. Preferably, propene, 1-butene, 1-hexene and 4-methyl-1-pentene can be used.

It is desirable that the aforesaid ethylene (co)polymer (A) have a number-average molecular weight (Mn) as measured by gel permeation chromatography (GPC) within the range of from 400 to 5000, preferably from 1000 to 4000, and more preferably from 1500 to 2500, and the relation between the crystallization temperature (Tc (° C.), measured at a cooling rate of 2° C./min) as measured by the differential scanning calorimetry (DSC) and the density (D (kg/m³)) as measured by the density gradient tube method should satisfy the following equation (II):

$$0.501 \times D - 366 \geq Tc \quad \text{(II),}$$

preferably the following equation (IIa):

$$0.501 \times D - 366.5 \geq Tc \quad \text{(IIa)}$$

and more preferably the following equation (IIb):

$$0.501 \times D - 367 \times Tc \quad \text{(IIb).}$$

When the relationship between the crystallization temperature (Tc) and density (D) of the ethylene (co)polymer (A) satisfies the aforesaid formula, the comonomer composition of the ethylene (co)polymer becomes more uniform, and as a result the sticky components of the ethylene (co)polymer are reduced and the blocking resistance tends to be improved.

It is desirable that the ethylene (co)polymer (A) be an ethylene α-olefin copolymer obtained from ethylene and propene and/or 1-butene, preferably an ethylene-propene copolymer. It is desirable that the density of the ethylene (co)polymer (A) be in the range of from 850 to 980 kg/m³, preferably from 890 to 970 kg/m³, and more preferably from 900 to 950 kg/m³.

It is desirable that in the ethylene (co)polymer (A) the relationship between the density (D (kg/m³)) as measured by density gradient tube method, the limiting viscosity ([η] (dl/g)) (measured at the 135° C. in decalin) and penetration (Y (dmm)) (measured according to JIS K2207) satisfy the following equation (III):

$$Y \leq -9.92 \times 10^{-4} [\eta]^{-2.71} \times D + [\eta]^{-2.68} \quad \text{(III).}$$

If the penetration satisfies the foregoing relation, the ink printed surface after the ink printing process can be protected, and the abrasion resistance to external frictional force tends to be improved.

The polyolefin wax for coating material (B) according to the present invention comprises the ethylene (co)polymer as described above. This polyolefin wax is a solid at room temperature and becomes a low-viscosity liquid at or above a temperature of from 80 to 120° C. The polyolefin wax for coating material (B) has a mean volume particle diameter in the range of from 0.3 μm to 20 μm, preferably from 0.3 to 15 μm, and more preferably from 1 to 5 μm.

If the mean volume particle diameter of the polyolefin wax for coating material (B) is within the aforesaid range, by adding a few percent of the polyolefin wax for an ink coating material (B) to an ink, the ink printing surface after the ink printing process can be protected, and the abrasion resistance to external frictional force tends to be improved.

In the polyolefin wax for coating material (B), the relation between a particle diameter a (μm), in which the weight ratio of the larger particle diameter side in weight particle-size distribution is 10%, and a particle diameter b (μm), in which the weight ratio of the smaller particle diameter side in weight particle-size distribution is 10%, satisfies the following equation (I):

$$a/b \leq 4 \qquad (I),$$

preferably satisfies the following equation (Ia):

$$a/b \leq 3.5 \qquad (Ia),$$

and more preferably satisfies the following equation (Ib):

$$a/b \leq 3.0 \qquad (Ib).$$

When a/b of the polyolefin wax (B) for coating material satisfies the aforesaid equation, the ethylene (co)polymer layer can be formed evenly on the ink surface, and the abrasion resistance and blocking resistance tend to be improved.

The particle diameter a, in which the weight ratio on the larger particle diameter side in weight particle-size distribution is 10%, and the particle diameter b, in which the weight ratio on the smaller particle diameter side in weight particle-size distribution is 10% can be obtained by dispersing a pulverized product of the ethylene (co)polymer in Isoton (a dispersant), measuring the particle size distribution using a Coulter counter (manufactured by Coulter Corp.), and calculating a and b from the data of the particle size distribution.

Examples of coating materials in which the polyolefin wax of the present invention can be used include printing inks, surface coating materials, hot melt type coating materials, and so on, and printing inks are especially desirable. The printing inks used in the present invention may be water-based, oil-based or solvent, and preferably is an oil-based ink or a solvent ink.

The ethylene polymer composition aqueous dispersion, the ethylene polymer composition organic solvent dispersion and the printing ink additives according to the present invention are explained below in detail.

The ethylene polymer composition aqueous dispersion of the present invention is obtained by dispersing particles of ethylene composition comprising:

(A) an ethylene polymer and
(C) modified ethylene polymer
in water.

First, the ethylene polymer (A) and modified ethylene polymer (C) used in the ethylene polymer composition aqueous dispersion according to the present invention are explained.

(A) Ethylene Polymer

The ethylene polymer (A) used in the present invention is an ethylene homopolymer or ethylene/α-olefin copolymer.

Examples of the α-olefin include propene, which has 3 carbon atoms, 1-butene, which has 4 carbon atoms, 1-pentene, which has 5 carbon atoms, 1-hexene and 4-methyl-1-pentene, which has 6 carbon atoms, 1-octene, which has 8 carbon atoms, and so on. Preferably propene, 1-butene, 1-hexene and 4-methyl-1-pentene can be used. The ethylene copolymer (A) has a number-average molecular weight (Mn) as measured by gel permeation chromatography (GPC) of from 400 to 8000, preferably from 1000 to 8000, and more preferably from 2000 to 5000.

If the number-average molecular weight (Mn) falls within the aforesaid range, the composition easily emulsifies when it is dispersed in water, and it becomes easier to disperse into small particles. In the ethylene polymer (A), the Mw/Mn is no greater than 4, preferably no greater than 2.9, and more preferably no greater than 2.8.

If the Mw/Mn falls within the aforesaid range, the low-tail constituents and the high-tail constituents are reduced, so that the dispersability during the emulsification is improved and more homogeneous dispersion is likely to be obtained.

Method of Manufacturing Ethylene (Co)polymer

Examples of catalysts which can be used for producing the aforementioned ethylene (co)polymer include homogeneous catalysts such as vanadium catalysts comprising a soluble vanadium compound and an organic aluminum compound, and metallocene catalysts comprising a metallocene compound of a transition metal selected from Group IV of the periodic table and an organic aluminumoxy compounds and/or an ionizing ionic compounds. Vanadium catalysts and metallocene catalysts are publicly known and include, for example, the followings:

(Soluble Vanadium Compounds)

$VOCl_3$ and $VCl_4$ can be cited as examples of the soluble vanadium compounds that can be used to form a vanadium catalyst. As the soluble vanadium compound, an electron donor adduct of a soluble vanadium compound obtained by contacting a soluble vanadium compound with an electron donor can also be used.

(Organic Aluminum Compounds)

$Et_2AlCl$, $Et_3Al$, and so on can be used as an organic aluminum compound which constitutes the vanadium catalyst.

(Metallocene Compounds)

The metallocene compound which constitutes the metallocene catalyst is a metallocene compound of a transition metal selected from Group IV of the periodic table. Specific examples of it include:

bis(cyclopentadienyl)zirconium monochloride monohydride, bis(cyclopentadienyl)zirconium dichloride, bis(1-methyl-3-butylcyclopentadienyl) zirconium bis(trifluoromethanesulfonate), bis(1,3-dimethylcyclopentadienyl) zirconium dichloride, ethylenebis(indenyl) dimethyl zirconium, ethylenebis(indenyl) zirconium dichloride, isopropanylidene (cyclopentadienyl-fluorenyl) zirconium dichloride, diphenylsilylenebis(indenyl) zirconium dichloride, methylphenylsilylenebis(indenyl) zirconium dichloride, rac-ethylene(2-methyl-1-indenyl)$^2$-zirconium-dichloride, rac-dimethylenesilylene(2-methyl-1-indenyl)$^2$-zirconium-dichloride, rac-dimethylsilylene-bis (4,7-dimethyl-1-indenyl) zirconium dichloride, rac-dimethylsilylene-bis(2,4,7-trimethyl-1-indenyl) zirconium dichloride, rac-dimethylsilylene-bis(2,4,6-trimethyl-1-indenyl) zirconium dichloride, rac-dimethylsilylene-bis(4-phenyl-1-indenyl) zirconium dichloride, rac-dimethylsilylene-bis(2-methyl-4-phenyl-1-indenyl) zirconium dichloride, rac-dimethylsilylene-bis(2-methyl-4-(α-naphthyl)-1-indenyl) zirconium dichloride, rac-dimethylsilylene-bis(2-methyl-4-(β-naphthyl)-1-indenyl) zirconium dichloride,rac-dimethylsilylene-bis(2-methyl-4-(1-anthryl)-1-indenyl) zirconium dichloride, (dimethyl(t-butylamide) (tetramethyl-$\eta^5$-cyclopentyldienyl)silane)titanium dichloride, ((t-butylamide) (tetramethyl-$\eta^5$-cyclopentadienyl)-1,2-ethanediyl) titanium dichloride, and so on. In addition, compounds in which the titanium in these metallocene compounds is replaced with zirconium or hafnium can also be cited.

(Organoaluminum Oxy-compound)

The organoaluminum oxy-compound can be a known aluminoxane, or a benzene-insoluble organoaluminum oxy-compound.

(Ionizing Ionic Compounds)

Lewis acids, ionic compounds, borane compounds and carborane compounds can be cited as examples of ionizing ionic compounds (also referred to as ionic ionizing compounds or ionic compounds).

In the formation of the metallocene catalyst, the aforesaid organic aluminum compounds can also be used together with the organoaluminum oxy-compounds and/or the ionizing ionic compounds.

(Polymerization)

The ethylene (co)polymer used in the present invention is produced by homopolymerizing ethylene usually in a liquid phase, or by copolymerizing ethylene, an α-olefin and other monomers to be copolymerized as needed, in the presence of the vanadium catalyst or the metallocene catalyst aforementioned. In this process, generally a hydrocarbon solvent is used, but an α-olefin may also be used as a solvent. The monomers to be used here are the same as those described above.

As the polymerization method, suspension polymerization, wherein the polymerization is conducted in the presence of ethylene (co)polymer particles in a solvent such as hexane, gas-phase polymerization, wherein a solvent is not used, or solution polymerization, wherein the polymerization is conducted in the presence of the ethylene (co)polymer, which coexists with a solvent or solely exists in a molten state, at a polymerization temperature of 140° C. or above, can be used. Among these solution polymerization is preferable from both aspects of economics and quality.

The polymerization reaction can be carried out by any of batchwise processes and continuous processes. When the polymerization is performed by batchwise process, the aforementioned catalyst constituents should be used in the concentrations explained below.

When a vanadium catalyst is used, the concentration of the soluble vanadium compound in the polymerization system is normally from 0.01 to 5 mmol/l (based on the polymerization volume), preferably from 0.05 to 3 mmol/l. The soluble vanadium compound should be supplied at a concentration of no greater than 10 times, preferably from 1 to 7 times, and more preferably from 1 to 5 times, of the concentration of the soluble vanadium compound in the polymerization system. The organic aluminum compound should be supplied in such an amount that the molar ratio of the aluminum atoms to the vanadium atoms (Al/V) in that polymerization system becomes 2 or more, preferably from 2 to 50, and more preferably from 3 to 20.

The soluble vanadium compound and organic aluminum compound are normally diluted with the aforementioned hydrocarbon solvents and/or monomer a in liquid phase. At this stage, it is desirable for the soluble vanadium compound to be diluted to the aforementioned concentration, and it is desirable for the organic aluminum compound to be adjusted to a desired concentration, for example, of no more than 50 times of the concentration in the polymerization system.

On the other hand, when a metallocene catalyst is used, the concentration of the metallocene compound in the polymerization system is normally from 0.00005 to 0.1 mmol/l (based on the polymerization volume), preferably from 0.0001 to 0.05 mmol/l. The organoaluminum oxy-compound is supplied in such an amount that the molar ratio of aluminum atoms to the transition metal in the metallocene compound (Al/transition metal) in the polymerization system becomes from 1 to 10,000, preferably from 10 to 5000.

The ionizing ionic compound is supplied in such an amount that the molar ratio of the ionizing ionic compound to the metallocene compound (ionizing ionic compound/metallocene compound) in the polymerization system becomes from 0.5 to 20, preferably 1 to 10. When an organic aluminum compound is used, normally it should be used in an amount of approximately from 0 to 5 mmol/l (based on the polymerization volume), preferably from 0 to 2 mmol/l.

When the polymerization is performed in the presence of the aforementioned vanadium catalyst, the polymerization reaction normally should be carried out at a temperature of from −50 to +100° C., preferably from −30 to +80° C., and more preferably from −20 to +60° C., at the pressure of greater than 0 and no greater than 4.9 MPa (50 kgf/cm$^2$, gauge pressure), preferably greater than 0 and no greater than 2.0 MPa (20 kgf/cm$^2$, gauge pressure).

When the polymerization is performed in the presence of the aforementioned metallocene catalyst, the polymerization reaction normally should be carried out at a temperature of from −20 to +150° C., preferably from 0 to +120° C., and more preferably from 0 to +100° C., at the pressure of greater than 0 and no greater than 7.8 MPa (80 kgf/cm$^2$, gauge pressure), preferably greater than 0 and no greater than 4.9 MPa (50 kgf/cm$^2$, gauge pressure).

In the polymerization, the ethylene and α-olefin used as needed are supplied to the polymerization system in a quantitative ratio so that the ethylene (co)polymer of the aforesaid specified composition will be obtained. In the polymerization, a molecular weight adjustment agent such as hydrogen may also be added.

When the polymerization is carried out in this way, the polymer produced is normally obtained as a polymerization liquid containing the polymer, and the ethylene (co)polymer of the present invention is obtained by normal treatment thereof.

The polymerization reaction can be carried out using any of the various types of catalyst systems described above, but among these, the use of a metallocene catalyst, particularly, a catalyst comprising a CGC type metallocene compounds such as (dimethyl(t-butylamide) (tetramethyl-$\eta^5$-cyclopentyldienyl) silane)titanium dichloride and ((t-butylamide) (tetramethyl-$\eta^5$-cyclopentadienyl)-1,2-ethanediyl) titanium dichloride is desirable. Moreover, in the present invention, the use of a metallocene catalyst in the manufacture of an ethylene.α-olefin copolymer is desirable.

It has been reported that solid ethylene.α-olefin copolymers produced using a metallocene catalyst have crystalline domains, which microscopically are lamellar crystals, having smaller and more uniform thickness in comparison to ethylene.α-olefin copolymers produced using a conventional Ziegler catalyst (Tetsuya Harada, *Next-Generation Polymer Engineering Technology Using Metallocene Catalysts*, 1995, Inter-Research). Therefore it is possible to obtain fine particles with a higher yield and a narrower particle size distribution by pulverizing the ethylene.α-olefin copolymer synthesized with a metallocene catalyst.

The metallocene compounds described above can be used alone or in combination of 2 or more. The metallocene compounds can also be diluted with a hydrocarbon, halogenated hydrocarbon and so on and used.

(Polymerization)

The ethylene polymer (A) used in the present invention can be obtained by homopolymerizing ethylene usually in a liquid phase, or by copolymerizing ethylene, an α-olefin and other monomer to be copolymerized as needed, in the presence of the vanadium catalyst or the metallocene catalyst aforementioned. In this process, generally hydrocarbon solvents are used, but an α-olefin may also be used as a solvent. The monomers used in this case are the same as those described above.

As the polymerization method, suspension polymerization, wherein the polymerization is conducted in the presence of ethylene polymer (A) particles in a solvent such as hexane, gas-phase polymerization, wherein a solvent is not used, or solution polymerization, wherein polymerization is performed in the presence of ethylene (co)polymer which coexists with a solvent or solely exists in a molten state, at a polymerization temperature of 140° C. or above, can be used. Among these, solution polymerization is preferable from both aspects of economics and quality.

The polymerization reaction can be carried out by any of batchwise processes and continuous processes.

(Polymerization)

Polymerization can be carried out in either a liquid-phase polymerization process such as a solvent polymerization or a suspension polymerization, or a gas-phase polymerization process. Specific examples of inert hydrocarbon solvents used in the liquid-phase polymerization process include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane, and blends thereof. The olefin itself can also be used as a solvent.

When olefin polymerization is performed using the olefin polymerization catalyst as described above, the complex compound is normally used in an amount of from $10^{-12}$ to $10^{-2}$ mol, preferably from $10^{-10}$ to $10^{-3}$ mol.

The organic metal compound normally is used in such an amount that the molar ratio between the organic metal compound and transition metal atoms (M) in the complex compound (organic metal compound/M) becomes from 0.01 to 100,000, preferably from 0.05 to 50,000.

The organic aluminum oxy compound normally is used in such an amount that the molar ratio between the aluminum atoms in the organic aluminum oxy compound and transition metal atoms (M) in the complex compound (Al/M) becomes from 10 to 500,000, preferably from 20 to 100,000.

The ionizing ionic compound normally is used in such an amount that the molar ratio between the ionizing ionic compound and transition metal atoms (M) in the complex compound (ionizing ionic compound/M) becomes from 1 to 20, preferably from 1 to 10.

It is also desirable for the olefin polymerization temperature where this type of olefin polymerization catalyst is used to be in a range of from −50 to +200° C., preferably from 0 to 170° C. The polymerization pressure normally should be in the range of from normal pressure to 9.8 MPa (100 kg/cm², gauge pressure), preferably from normal pressure to 4.9 MPa (50 kg/cm², gauge pressure), and the polymerization reaction can be performed by any of a batch process, a semi-continuous process or a continuous process. The polymerization can also be performed with more than two polymerization stages under different reaction conditions.

By means of this process, an ethylene polymer containing a vinyl-type or a vinylidene-type unsaturated bond at one end of the polymer chain is obtained. This ethylene polymer can be used for an —$SO_3$— adduct of the modified ethylene polymer (C).

(Ethylene (Co)polymer Pulverization Method)

There is no special limitation with respect to the method for obtaining the pulverized ethylene (co)polymer, so long as it is able to pulverize the ethylene (co)polymer. For example, a pulverization method, in which a jet mill, a vibrating ball mill, an agitation mill, a planetary mill, or the like is used, can be cited. When manufacturing a pulverized product of ethylene (co)polymer, it is desirable to perform a preliminary pulverization to a particle diameter of about 1 mm using a pulverizing machine such as a ball mill, a pin mill, a screen mill or a tube mill.

A specific example of a pulverization method for the ethylene (co)polymer is described using a method which uses an air jet mill as a pulverizing machine. First, the ethylene (co)polymer is roughly pulverized into a diameter of about 1 mm. It is then fed to the air jet mill main unit by means of a table feeder at a constant rate in a frozen state. The fine powder of ethylene (co)polymer obtained is then sent to an air classifier, the low-diameter fraction is removed, and the desired particle size distribution is achieved. The powder recovery efficiency can be improved by optimizing the source pressure of the air, the amount of gas in the re-circulated gas, and the degree of suction in the powder recovery line. The particle size distribution can be controlled by adjusting the gas amount and the feeding rate.

Further, in preliminary pulverization and fine pulverization, it is also possible to apply a granulation method other than pulverization, such as a crystallization method or a spray type granulation method using a solvent, or a emulsification-dispersion method using water.

The coating material can be used as a coating layer normally having a thickness of from 0.1 to 100 μm on various types of base materials.

Printing Ink Composition

The printing ink composition according to present invention contains a polyolefin wax (ethylene (co)polymer) in an amount of from 0.1 to 10 wt %, preferably from 0.5 to 5 wt %, based on the entire amount of printing ink composition. This polyolefin wax may be used alone or in a combination of 2 or more types.

When the amount of polyolefin wax contained is within the aforementioned range, balance between the abrasion resistance and the blocking resistance in the coating material tends to be improved. The polyolefin wax can be added in any step of the processes conventionally used for manufacturing printing inks. Specifically, a pigment and the polyolefin wax can be dispersed together in a varnish, and kneaded to form an ink, or the polyolefin wax can be blended with a material that has undergone dispersion and kneading processes to form an ink. A similar effect can also be obtained by blending an anti-slipping agent with a printing ink product.

Any publicly known method can be used as the kneading means used in the printing ink manufacturing process, but a biaxial extruder, a monoaxial extruder, a kneader, and a Banbury mixer can be cited as preferred examples.

The printing ink composition of the present invention may also contain various types of secondary ingredients, such as dispersants, emulsifiers, surfactants, stabilizers, lubricants, thickeners, foaming agents, antifoaming agents, coagulants, gelatinizers, anti-precipitation agents, electrostatic control agents, antistatic agents, anti-aging agents, softeners, plasticizers, fillers, colorants, fragrances, anti-adhesion agents or mold separation agents,, to an extent that does not impair the performance of the ink.

(C) Modified Ethylene Polymer

The modified ethylene polymer (C) is a modified ethylene polymer obtained by modifying an ethylene homopolymer or ethylene/α-olefin copolymer with an unsaturated carboxylic acid or a derivative thereof, or with a sulfonate.

Examples of ethylene homopolymers and ethylene/α-olefin copolymer used in the preparation of the modified ethylene polymer (C) (hereinafter referred to as "raw material ethylene polymer") include, for example, the aforementioned ethylene polymers (A).

The modified ethylene polymer (C) can be prepared by a known method, for example, by kneading (i) the raw material ethylene polymer and (ii) an unsaturated carboxylic acid or derivative thereof, or a sulfonate in the presence of (iii) a polymerization initiator such as an organic peroxide, or by kneading in a solution obtained by dissolving (i) the raw material ethylene polymer and (ii) an unsaturated carboxylic acid or derivative thereof, or a sulfonate in an organic solvent, in the presence of (iii) a polymerization initiator such as an organic peroxide.

Examples of unsaturated carboxylic acids and derivatives thereof which can be used in the modification to obtain the modified ethylene polymer (C) include acrylic esters such as methyl acrylate, ethyl acrylate, butyl acrylate, sec-butyl acrylate, isobutyl acrylate, propyl acrylate, isopropyl acrylate, 2-octyl acrylate, dodecyl acrylate, stearyl acrylate, hexyl acrylate, isohexyl acrylate, phenyl acrylate, 2-chlorophenyl acrylate, diethylaminoethyl acrylate, 3-methoxybutyl acrylate, acrylic acid diethylene glycol ethoxylate, and 2,2,2-trifluoroethyl acrylate; methacrylic esters such as methyl methacrylate, ethyl methacrylate, butyl methacrylate, sec-butyl methacrylate, isobutyl methacrylate, propyl methacrylate, isopropyl methacrylate, 2-octyl methacrylate, dodecyl methacrylate, stearyl methacrylate, hexyl methlacrylate, decyl methacrylate, phenyl methacrylate, 2-chlorohexyl methacrylate, diethylaminoethyl methacrylate, 2-hexylethyl methacrylate and 2,2,2-trifluoroethyl methacrylate; maleic esters such as ethyl maleate, propyl maleate, butyl maleate, diethyl maleate, dipropyl maleate and dibutyl maleate; fumaric esters such as ethyl fumarate, butyl fumarate and dibutyl fumarate; dicarboxylate acids such as maleic acid, fumeric acid, itaconic acid, crotonic acid, nadic acid, and methylhexylhydrophthalic acid; anhydrides such as maleic anhydride, itaconic anhydride, citraconic anhydride, allylsuccinic anhydride, nadic anhydride, and so on.

It is desirable that the amount of modification by the unsaturated carboxylic acid or derivative thereof in the modified ethylene copolymer (C) be in the range of from 30 to 100 mg KOH, preferably from 30 to 60 mg KOH, per 1 g of polymer, calculated by KOH titration.

If the amount of modification by the unsaturated carboxylic acid or derivative thereof falls within the aforesaid range, the moisture absorbency of the fine particles obtained from the aqueous dispersion will be appropriate, and properties such as water resistance and weather resistance will tend to be improved. Moreover, the phase inversion after water addition will be sufficient, and the aqueous dispersion will be able to be obtained at a high yield.

When modification is performed with a sulfonate, the amount of modification should be in the range of from 0.1 to 100 mmol, preferably from 5 to 50 mmol, per 1 g of polymer.

If the amount of modification by a sulfonate is within the aforesaid range, unemulsified materials will hardly be formed, and coagulated sulfonates other than the emulsion will hardly be formed, too.

Method for Preparing Ethylene Copolymer Composition Aqueous Dispersion

The ethylene copolymer composition aqueous dispersion according to the present invention can be prepared, for example, by dispersing an ethylene copolymer composition obtained from the aforesaid ethylene copolymer (A) and modified ethylene polymer (C) in water.

Specifically, the ethylene copolymer (A) and modified ethylene polymer (C) are melt-kneaded, at first. At this time, it is desirable that the weight ratio (A/C) of the ethylene polymer (A) and modified ethylene polymer (C) be in the range of from 95/5 to 50/50, preferably from 90/10 to 60/40.

The temperature in melt-kneading should be equal to or higher than the higher of the melting points of the ethylene polymer (A) and that of modified ethylene polymer (C), preferably equal to or higher than a temperature at which the molten viscosity thereof becomes $10^5$ poise or less.

Next, water is added into the melt-kneaded product, then the resin and the water are kneaded while the resin being kept in a molten state so that the solid portion of the resin can form dispersion particles. By doing so, a phase inversion of the molten resin to an aqueous dispersion can be achieved. In this step, the basic substances and the surfactants described below may be added.

It is desirable that water be added in an amount of from 1 to 40 wt %, preferably from 15 to 30 wt % of the total amount of the ethylene polymer composition aqueous dispersion.

The basic substance may be added alone, or added as an aqueous solution. It is preferable that the basic substance be dissolved in water when it is added. The amount of the basic substance to be added is normally the amount required to neutralize the modified ethylene polymer.

The 50% mean volume particle diameter of the dispersion particles of the ethylene polymer composition aqueous dispersion should be in a range of from 0.1 to 10 $\mu$m, preferably from 0.2 to 5 $\mu$m.

The ethylene polymer composition aqueous dispersion thus obtained should comprise a solid constituent of at least 60 wt %, preferably at least 70 wt %. It is desirable that the high-solid-content ethylene polymer composition aqueous dispersion be a solid in appearance and the solid component homogeneously disperse into the aqueous phase as fine particles when water is added.

The ethylene polymer composition aqueous dispersion according to the present invention can be used in various applications, but is suitable for an additive for printing inks, particularly an additive for water-based inks, and is able to provide an ink with a superior combination of abrasion resistance and blocking resistance.

The high-solid-content ethylene polymer composition aqueous dispersion may be changed into a liquid aqueous dispersion having fluidity by addition of a substance such as water or a basic aqueous solution (including warm water) as needed and agitation. By dispersing the high-solid-constituent ethylene polymer composition aqueous dispersion homogeneously and finely into water in this manner, the physical properties of the dispersion such as solid concentration, viscosity and pH can be adjusted in a wide range, then the dispersion can be added to a wide variety range of inks. As described above, the ethylene polymer composition aqueous dispersion in which the solid concentration, viscosity, pH and so on have been adjusted is able to provide an ink with a superior combination of abrasion resistance and blocking resistance.

(Basic Substance)

As the basic substance, any of the following substances which act as a base in water can be used. For example, alkali metals; alkali earth metals; ammonia; amines; oxides, hydroxides, weak acid salts or hydrides of alkali metals; oxides, hydroxides, weak acid salts or hydrides of alkali earth metals; alkoxides of alkali metals or alkali earth metals, etc. can be cited. As more specific examples, Sodium, potassium, and so on can be cited as alkali metals, and calcium, strontium, barium and so on as alkali earth metals;

Inorganic amines such as hydroxylamine and hydrazine, methylamine, ethylamine, ethanolamine, cyclohexylamine and so on can be cited as amines;

Sodium oxide, sodium peroxide, potassium oxide, potassium peroxide, strontium oxide, barium oxide, sodium hydroxide, potassium hydroxide, calcium hydroxide, strontium hydroxide, barium hydroxide, sodium hydride, potassium hydride, calcium hydride, sodium carbonate, calcium carbonate, sodium hydrogencarbonate, potassium hydrogencarbonate, calcium hydrogencarbonate, sodium acetate, potassium acetate, calcium acetate and so on as oxides, hydroxides, weak acid salts or hydrides of alkali metals or alkali earth metals; and ammonium hydroxide, quaternary ammonium compounds such as tetramethyl ammonium hydroxide, hydrazine hydrides and so on as ammonia or amine compounds can be cited.

(Surfactants)

In the ethylene polymer composition aqueous dispersion according to the present invention, surfactants may also be used as needed. When the modified ethylene copolymer (C) has been modified with a carboxylic acid or derivative thereof, a nonionic surfactant is suitable. When the modified ethylene copolymer (C) has been modified with sulfonic acid, an anionic surfactant is suitable. By using a surfactant, the dispersability to water of the ethylene polymer composition can be improved.

As a nonionic surfactant, one having a low hydrophile-lipophile balance (HLB), preferably one in which the HLB is 12 or less, more preferably 10 or less, and most preferably in a range of from 5 to 10, is desirable. Specifically, a surfactant whose HLB is within the aforesaid range can be selected from polyoxyethylene alkyl ethers, polyoxyethylene alkylphenyl ethers, polyoxyethylene fatty acid esters, polyoxyethylene fatty acid amide ethers, polyvalent alcohol fatty acid esters, polyoxyethylene polyvalent alcohol fatty acid esters, fatty acid sucrose esters, alkylolamides, polyoxyalkylene block copolymers, and so on, and be used. Since the HLB generally decreases when the amount of polyoxyethylene units contained in these nonionic surfactants is reduced, a nonionic surfactant having the desired HLB can be obtained by adjusting the molar amount of ethylene oxide addition. The addition weight of nonionic surfactant should be within a range of from 0.1 to 10 wt %, preferably from 0.3 to 2.0 wt %, of the modified ethylene polymer.

Any anionic surfactants that obtained from a reaction with a basic substance can be used as the anionic surfactant. For example, primary higher fatty acid salts, secondary higher fatty acid salts, primary higher alcohol sulfuric ester salts, secondary higher alcohol sulfuric ester salts, higher alkyl disulfonates, sulfonated higher fatty acid salts, higher fatty acid sulfuric ester salts, sulfuric ester salts of higher alcohol ethers, sulfates of higher alcohol ethers, alkolylated sulfuric ester salts of higher fatty acid amides, alkyl benzene sulfonates, alkyl phenol sulfonates, alkyl naphthalene sulfonates, alkyl benzoimidazole sulfonates and so on can be used as the anionic surfactant. More specific chemical species of these surfactants are described in, for example, Hiroshi Horiguchi's "Synthetic Surfactants," (1986, Sankyo Publishing). Among these, alkyl benzene sulfonates, more specifically, sodium dodecyl benzene sulfonate, are especially suitable.

As the method for adding such a surfactant, the surfactant can be blended as a raw material to the ethylene polymer (A) and modified ethylene polymer (C) or an aqueous solution of the surfactant can be prepared beforehand and be added during the melt-kneading. The amount of surfactant added should be no more than 10 wt %, preferably no more than 3 wt %, of the ethylene polymer composition aqueous dispersion. If a surfactant is contained in excess of 10 wt %, the absorbency of the fine particles obtained from the aqueous dispersion is increased, and properties such as water resistance and weather resistance deteriorate.

Ethylene Polymer Composition Organic Solvent Dispersion

The ethylene polymer composition organic solvent dispersion according to the present invention is obtained by dispersing the particles of the aforesaid ethylene polymer composition in a hydrocarbon solvent.

This ethylene polymer composition organic solvent dispersion can be prepared, for example, by re-dispersing in a hydrocarbon solvent the particles obtained by removing the water from the aforementioned ethylene polymer composition aqueous dispersion.

Specifically, by adding an acid in an amount necessary to neutralize the basic substance used in the preparation of the ethylene polymer composition aqueous dispersion, dispersed particles of the ethylene polymer composition can be made to aggregate. When an acid is added to the aqueous dispersion, the base, which forms the counter ions to the carboxyl anions, is neutralized, and the carboxyl groups are transformed into the hydrogen-ion-form, which has a low degree of electrolytic dissociation. Thus, the ethylene polymer composition particles significantly lose their self-emulsification properties or self-dispersing properties in water, and then aggregate.

Examples of acids which can be used for the neutralization include inorganic acids such as sulfuric acid, hydrochloric acid, nitric acid and phosphoric acid, and organic acids such as various types of sulfonic acids. By using such acids, the salt formed as a result of the neutralization exhibits solubility in water. The acid used in neutralization normally should be used in such an amount that the pH of the aqueous phase is no higher than 6, preferably is in the range of from 2 to 4.

The temperature of the aqueous dispersion during the neutralization is normally in the room temperature range, but may be heated to about 60° C. if desired. The concentration of the aqueous dispersion should be in a range of from 5 to 50 wt % in consideration of operability.

Next, the ethylene polymer composition particles thus aggregated are separated from the water. There are no special limitations with respect to the method of the separation, and methods such as filtration, centrifugal separation and floating separation can be used. If a centrifugal separation device equipped with filter is used, the water removal operation and the subsequent operation whereby the wet cake is washed with a hydrophilic solvent can be performed effectively and using the same device.

By washing the wet cake of aggregate obtained by separating the particles and water in the ethylene compound composition while it is still wet using a hydrophilic solvent, the water retained in the wet cake can be exchanged for the hydrophilic solvent and removed.

Thus, by washing the wet cake with a hydrophilic solvent, nearly all of the moisture retained can be removed. Moreover, by washing with a hydrophilic solvent in this way, the wet cake does not present a dry state. Accordingly, the ethylene polymer composition does not lose its original lipophilic properties, and the ethylene polymer composition particles do not exhibit reduced redispersability in an organic solvent.

The solvent used as the hydrophilic solvent is one that can be dissolved in an amount of 10 wt % or more at normal temperature in both water and the hydrocarbon organic solvent which used as the redispersion solvent. Alcohols, ketones and ethers are desirable solvents to be used as this type of hydrophilic solvent.

If the hydrocarbon solvent used in the redispersion as described below is a hydrophilic solvent, the hydrocarbon solvent used in the redispersion can also be used in the aforementioned washing of the wet cake. The hydrophilic solvent should be used in an amount equal to or greater than the weight of the particles in the wet cake.

Next, the wet cake, which has been washed with the hydrophilic solvent, is redispersed in a hydrocarbon solvent. The hydrocarbon used as the hydrocarbon solvent can be selected at the discretion of the user. For example, if the ethylene polymer composition organic solvent dispersion is used as a blending agent of a gravure ink, or the like, a solvent such as toluene, xylene, methyl isopropyl ketone or isopropyl alcohol is desirable, and if used as a blending agent for an offset ink or the like, a solvent that has higher boiling-point than that of the solvent described above, such as n-decane, light oil, or light oil fractional solvent is preferable.

In order to redisperse the ethylene polymer composition particles in a hydrocarbon solvent, normally agitation is performed for from 10 to 300 min using an agitation device. In particular, by using a high-performance dispersion device such as a homomixer, redispersion can be performed with high efficacy. By redispersing the wet cake in a hydrocarbon solvent in this way, a dispersion in which particles of ethylene polymer composition are dispersed in a hydrocarbon solvent (ethylene polymer composition organic solvent dispersion) can be obtained. In the ethylene polymer composition organic solvent dispersion obtained in this way, the moisture content should be no greater than 2.5 wt %, preferably no greater than 2 wt %, and more preferably within the range of from 0 to 1.0 wt %.

In order to increase the stability in storage, a dispersant or a viscosity adjusting agent such as an oil-soluble high molecular weight polymer or an organic bentonite can be added to the ethylene polymer composition organic solvent dispersion.

This type of ethylene polymer composition organic solvent dispersion can be used in various applications, but in particular is appropriate for use as a printing ink additive, and is able to provide an ink with a superior combination of abrasion resistance and blocking resistance.

In addition, the aggregated wet cake obtained by separating the particles of the aforesaid ethylene polymer composition from the water, and the wet cake obtained by washing this wet cake with a hydrophilic solvent are also particularly suitable for use as a printing ink additive, and are able to provide a superior combination of abrasion resistance and blocking resistance.

Ink Additive

The printing ink additive according to the present invention is blended so that the amount of the solid constituent is in the range of from 0.1 to 10 wt %, preferably from 0.5 to 5 wt %, based on the entire amount of the printing ink.

If the amount of solid constituent derived from the printing ink additive falls within the aforesaid range, the printing ink will tend to have a superior balance of abrasion resistance and blocking resistance.

As a method of adding the printing ink additive, any method used in conventional printing ink manufacturing processes can be used. Specifically, an ink can be formed by kneading a composition obtained by dispersing a pigment and the printing ink additive into a varnish, or an ink can be formed by blending the printing ink additive to a material obtained from dispersion and kneading processes.

Any publicly known kneading method can be used as the kneading mean for the printing ink manufacturing process of the invention. For example, a biaxial extruder, a monoaxial extruder, a kneader, or a Banbury mixer can be used as preferred kneading means.

Additionally, when preparing the printing ink, along with the printing ink additives, other various types of secondary ingredients may be added. For example, dispersants, emulsifiers, surfactants, stabilizers, lubricants, thickeners, foaming agents, antifoaming agents, coagulants, gelatinizers, anti-precipitation agents, electrostatic control agents, antistatic agents, anti-aging agents, softeners, plasticizers, fillers, colorants, fragrances, anti-adhesion agents, mold separation agents, and so on can be added, to an extent that does not impair its performance.

Although there are no special restrictions regard to the resin which constitutes the main ingredient of the printing ink, normally, water-soluble resins such as starch, dextrin, alginate, cellulose ester, cellulose ether, polyvinyl alcohol, polyvinyl methyl ether, polyacrylamide, polyethylene oxide, and polyacrylate, colloidal emulsions of materials such as shellac, styrenated shellac, rosin maleic resins, casein and its derivatives, and acrylic copolymers, and emulsions of materials such as acrylic resins, acrylic styrene copolymer resins, vinyl acetate based resins, styrene based resins, vinyl chloride based resins, synthetic rubber latex, polyurethane, polyester, alkyd esters, epoxy esters, and rosin esters can be used.

The polyolefin wax for a coating material according to the present invention is able to improve abrasion resistance and blocking resistance of a coating material simultaneously when added to the coating material. The printing ink composition according to the present invention has both excellent abrasion resistance and excellent blocking resistance.

The ethylene polymer composition aqueous dispersion, the ethylene polymer composition organic solvent dispersion and the printing ink additive according to the present invention are able to provide an ink that has a combination of excellent abrasion resistance and excellent blocking resistance.

EXAMPLES

The present invention is explained in further detail based on the following examples, but the present invention is not in any way limited by these examples.

Production Example a1

Production of Ethylene.α-olefin Copolymer (WAX a1)

Using a metallocene catalyst, and ethylene.α-olefin copolymer was produced as described below.

A stainless-steel autoclave thoroughly flushed with nitrogen and having an interior volume of 2 l was charged with 950 ml of hexane and 50 ml of propene, and hydrogen was introduced until the pressure reached 1.0 kg/cm² (gauge pressure). Then, after the system temperature was raised to 150° C., polymerization was started by adding 0.3 mmol of triisobutyl aluminum, 0.004 mmol of triphenylcarbenium tetrakis(pentafluorophenyl) borate, and 0.02 mmol of (t-butylamide) dimethyl (tetramethyl-η⁵-cyclopentadienyl) silane titanium dichloride (manufactured by Sigma-Aldrich Corp.) by pressure-injection with ethylene. Then, polymerization was carried out for 20 min at 150° C. while the entire pressure was maintained at 30 kg/cm² (gauge pressure) by continuous feeding of ethylene only.

After polymerization was halted by adding a small amount of ethanol to the system, the unreacted ethylene and propene were purged. The polymer solution obtained was dried overnight under reduced pressure at 100° C. As a result, a 32.5 g of ethylene.propene copolymer in which the Mn was 2050, the propene content was 7.3 mol %, the density was 920 kg/m³, and the crystallization temperature was 93° C., was obtained, and was designated as WAX a1.

Production Example a2

Production of Ethylene.α-olefin Copolymer (WAX a2)

Polymerization was performed in the same way as in Production Example a1, except for the fact that the autoclave was charged with 935 ml of hexane and 65 ml of 1-butene as the α-olefin constituent, and hydrogen was introduced until the pressure reached 1.5 kg/cm² (gauge pressure). 37.5 g of an ethylene.1-butene copolymer in which the Mn was 1900, the 1-butene content was 5.6 mol %, the density was 920 kg/m³, and the crystallization temperature was 93° C. was obtained, and was designated as WAX a2.

Production Example a3

Production of Ethylene.α-olefin Copolymer (WAX a3)

Polymerization was performed in the same way as in Production Example a1, except for the fact that 935 ml of hexane and hydrogen were introduced until the pressure reached 1.0 kg/cm² (gauge pressure). 38.8 g of an ethylene copolymer in which the Mn was 2000, the density was 977 kg/M³, and the crystallization temperature was 110° C. was obtained, and was designated as WAX a3.

Comparative Production Example a1

Preparation of the Catalyst 25 g of commercially available sold anhydrous magnesium hydrochloride was suspended in 500 ml of hexane in a 1.5 l glass autoclave. While this was agitated and maintained at 30° C., 92 ml of ethanol was added by dripping over 1 hr, and the reaction continued for 1 hr further. After the completion of the reaction, 93 ml of dimethyl aluminum monochloride was added by dripping over 1 hr, and the reaction continued for 1 hr further. After completion of the reaction, 90 ml of titanium tetrachloride was added by dripping, the reaction vessel was heated to 80° C., and reaction was performed for 1 hr.

After the completion of the reaction, the solid fraction was washed with hexane until free titanium could no longer be detected by decantation. A hexane liquid suspension was prepared from the solid fraction, the titanium concentration was determined by titration, and the substance was used in the following experiments.

Production of Ethylene.α-olefin Copolymer (WAX a4)

A stainless-steel autoclave thoroughly flushed with nitrogen and having an interior volume of 2 l was charged with 930 ml of hexane and 70 ml of 1-butene, and hydrogen was introduced until the pressure reached 20.0 kg/cm² (gauge pressure). Then, after the system temperature was raised to 170° C., polymerization was started by adding 0.1 mmol of triethyl aluminum, 0.4 mmol of ethyl aluminum sesquichloride, and 0.008 mmol (amount of titanium atom) of the titanium constituent obtained as described above by pressure-injection with ethylene. Then, polymerization was carried out for 40 min at 170° C. while the entire pressure was maintained at 40 kg/cm² (gauge pressure) by continuous feeding of ethylene only.

After the polymerization was halted by adding a small amount of ethanol to the system, the unreacted ethylene and 1-butene were purged. The polymer solution obtained was dried overnight under reduced pressure at 100° C. As a result, 129 g of an ethylene.1-butene copolymer in which the Mn was 2000, the 1-butene content was 5.4 mol %, the density was 917 kg/m³, and the crystallization temperature was 101° C., was obtained, and was designated as WAX a4.

Production Examples a4 through a14

Polymerization was performed in the same way as in Production Example a1, except for the fact that the amounts of hydrogen and propylene added were varied. The results are shown in Table a1.

Comparative Production Examples a2 through a10

Polymerization was performed in the same way as in Comparative Production Example a1, except for the fact that the amounts of hydrogen and propylene added were varied, and propylene was used as a comonomer. The results are shown in Table a1.

TABLE 1a

| Ethylene-based polymer name | Catalyst type | α-olefin type | α-olefin content (mol %) | Number-average molecular wt (Mn) | [η] (dl/g) | Density (D) (kg/m³) | Penetration (dmm) | Left side of formula (II) | Crystallization temperature (Tc) (° C.) | |
|---|---|---|---|---|---|---|---|---|---|---|
| WAX a1 | Metallocene | Propene | 7.3 | 2050 | 0.22 | 920 | 1 | 94.9 | 93 | Production Ex. a1 |
| WAX a2 | Same as Prod. Ex. a1 | 1-butene | 5.6 | 1900 | 0.22 | 920 | 1 | 94.9 | 93 | Production Ex. a2 |
| WAX a3 | Same as Prod. Ex. a1 | None | 0 | 2000 | 0.22 | 977 | 0 | 123 | 110 | Production Ex. a3 |
| WAX a4 | Ziegler | 1-butene | 5.4 | 2000 | 0.2 | 917 | 3 | 93.5 | 101 | Comp. Prod. Ex. a1 |
| WAX a5 | Same as Prod. Ex. a1 | Propene | | 2000 | 0.22 | 957 | 0 | | | Production Ex. a4 |
| WAX a6 | Same as Prod. Ex. a1 | Propene | | 2000 | 0.26 | 927 | 1 | | | Production Ex. a5 |
| WAX a7 | Ziegler | None | | 1900 | 0.22 | 980 | 0 | | | Comp. Prod. Ex. a2 |
| WAX a8 | Ziegler | Propene | | 2000 | 0.22 | 950 | 2 | | | Comp. Prod. Ex. a3 |
| WAX a9 | Ziegler | Propene | | 2000 | 0.22 | 930 | 3 | | | Comp. Prod. Ex. a4 |

TABLE 1a-continued

| Ethylene-based polymer name | Catalyst type | α-olefin type | α-olefin content (mol %) | Number-average molecular wt (Mn) | [η] (dl/g) | Density (D) (kg/m³) | Penetration (dmm) | Left side of formula (II) | Crystallization temperature (Tc) (° C.) | |
|---|---|---|---|---|---|---|---|---|---|---|
| WAX a10 | Ziegler | Propene | | 2500 | 0.26 | 924 | 4 | | | Comp. Prod. Ex. a5 |
| WAX a11 | Same as Prod. Ex. a1 | None | | 1300 | 0.19 | 974 | 0 | | | Production Ex. a6 |
| WAX a12 | Same as Prod. Ex. a1 | Propene | | 1300 | 0.19 | 955 | 0 | | | Production Ex. a7 |
| WAX a13 | Same as Prod. Ex. a1 | Propene | | 1700 | 0.19 | 934 | 1 | | | Production Ex. a8 |
| WAX a14 | Same as Prod. Ex. a1 | Propene | | 1700 | 0.19 | 923 | 3 | | | Production Ex. a9 |
| WAX a15 | Same as Prod. Ex. a1 | Propene | | 1700 | 0.19 | 917 | 3 | | | Production Ex. a10 |
| WAX a16 | Ziegler | None | | 1300 | 0.19 | 973 | 0 | | | Comp. Prod. Ex. a6 |
| WAX a17 | Ziegler | Propene | | 1700 | 0.19 | 926 | 7 | | | Comp. Prod. Ex. a7 |
| WAX a18 | Same as Prod. Ex. a1 | None | | 900 | 0.13 | 970 | 0 | | | Production Ex. a11 |
| WAX a19 | Same as Prod. Ex. a1 | Propene | | 1000 | 0.13 | 942 | 2 | | | Production Ex. a12 |
| WAX a20 | Same as Prod. Ex. a1 | Propene | | 1000 | 0.13 | 923 | 7 | | | Production Ex. a13 |
| WAX a21 | Same as Prod. Ex. a1 | Propene | | 1200 | 0.13 | 914 | 7 | | | Production Ex. a14 |
| WAX a22 | Ziegler | None | | 1100 | 0.13 | 970 | 1 | | | Comp. Prod. Ex. a8 |
| WAX a23 | Ziegler | Propene | | 1000 | 0.13 | 940 | 4 | | | Comp. Prod. Ex. a9 |
| WAX a24 | Ziegler | Propene | | 1200 | 0.13 | 920 | 13 | | | Comp. Prod. Ex. a10 |

Pulverization of the Ethylene Copolymer

All of the samples obtained above were coarsely pulverized to 2 mm square particles using a tabletop power mail (manufactured by Dalton Corp.).

The fine pulverization of the ethylene copolymer was carried out as follows.

1) Device—Jet mill: Ultra-High-Speed Pulverizer LABO JET (manufactured by Nippon Pneumatic Mfg. Co., Ltd.)
2) Pulverization Conditions
   All samples were used after immersion for at least 1 min in liquid nitrogen immediately before the pulverization.

Sample feeding speed: 1 g/min to 50 g/min (adjusted in accordance with the particle diameter)
   Primary air pressure: 6 g/cm²G
   Gas flow amount: 0.4 Nm³/min
   Louver Types: three types were used: large, medium and small, and particle diameter was controlled by adjusting the balance with the clearance of grading zones. (When the louver diameter is small and the grading clearance is large, the particle diameter becomes small.)
3) Secondary grading conditions (not performed for comparative powders 5 and 6)
   Gas flow amount: 0.4 Nm³/min TABLE a2

| | Raw material WAX | Volume-average particle diameter (μM) | 10% large particle diameter region particle diameter a (μm) | 10% small particle diameter region particle diameter b (μm) | a/b |
|---|---|---|---|---|---|
| Powder 1 | WAX a1 | 4.3 | 8.1 | 2.5 | 3.2 |
| Powder 2 | WAX a2 | 4.5 | 8.5 | 2.7 | 3.1 |
| Powder 3 | WAX a3 | 4.2 | 7.9 | 2.8 | 2.8 |
| Powder 4 | WAX a1 | 12.5 | 21.1 | 6.2 | 3.4 |
| Comp. Powder 5 | WAX a1 | 5.2 | 10.5 | 2.2 | 4.8 |
| Comp. Powder 6 | WAX a1 | 12.1 | 23.2 | 2.0 | 11.6 |
| Comp. Powder 7 | WAX a4 | 4.4 | 8.3 | 2.3 | 3.6 |

Preparation of Printing Ink 12 g of nitrocotton (LIG1/8 (N.V. 70%), manufactured by Asahi Chemical Industry Co., Ltd.) having an average degree of polymerization of 45 to 55 and a nitrogen content of 10.7 to 11.4 wt %, 4 g of titanium acetyl acetonate (Orgatix TC-100 (N. V. 75%), manufactured by Matsumoto Yakuhin Kogyou K.K.), 4 g of butyral resin (Denkabutyral #2000-L, manufactured by Denki Kagaku Kogyou K.K.), 69 g of blended solvent (ethyl acetate:IPA=30:70), 10 g of Phthalocyanine Blue (Wako Pure Chemical Industries, Ltd., Reagent Special Grade) and 1 g of the wax powder 1 prepared as described above and described in Table 2 were kneaded for 1 hr by attriter, and a printing ink composition (A) having 26.4% of nonvolatile ingredients was prepared. Other inks containing powders and comparative powders were also prepared similarly. The blend amounts (g) of the constituents of the inks prepared are shown in Table a3.

TABLE a3

| Ink blend type | Ink 1 | Ink 2 | Ink 3 | Ink 4 | Comp. Ink 5 | Comp. Ink 6 | Comp. Ink 7 |
|---|---|---|---|---|---|---|---|
| Nitrocotton | 12 | 12 | 12 | 12 | 12 | 12 | 12 |
| Titanium acetyl acetonate | 4 | 4 | 4 | 4 | 4 | 4 | 4 |
| Butyral resin | 4 | 4 | 4 | 4 | 4 | 4 | 4 |
| Blended solvent ethyl acetate/IPA = 30/70 | 69 | 69 | 69 | 69 | 69 | 69 | 69 |
| Pigment | 10 | 10 | 10 | 10 | 10 | 10 | 10 |
| Powder 1 (source: WAX a1) | 1 | — | — | — | — | — | — |
| Powder 2 (source: WAX a2 | — | 1 | — | — | — | — | — |
| Powder 3 (source: WAX a3) | — | — | 1 | — | — | — | — |
| Powder 4 (source: WAX a1) | — | — | — | 1 | — | — | — |
| Comp. Powder 5 (source: WAX a1) | — | — | — | — | 1 | — | — |
| Comp. Powder 6 (source: WAX a1) | — | — | — | — | — | 1 | — |
| Comp. Powder 7 (source: WAX a4) | — | — | — | — | — | — | 1 |

Rating Method for Abrasion Resistance:

{1} The aforesaid base material was coated with ink so as to have a dry film thickness of 3 to 4 μm.

{2} Allowed to stand and dried for 2 days at room temperature.

{3} JSPS (Japan Society for the Promotion of Science) Abrasion Resistance Tester Type II (Tester Sangyou K.K.) was Used Friction paper: CRC cardboard Load, number of friction cycles: 200 g×500 times {4} Rating: ink-coated surface was rubbed with cardboard attached to the friction element, and the degree of transfer of ink to the cardboard was rated according to four ranks:

(good) 4-3-2-1 (poor)

4: Excellent abrasion resistance, hardly any ink was adhered to cardboard.

3: Excellent abrasion resistance, but slight adhesion of ink to cardboard was observed.

2: Adhesion of ink to cardboard clearly was observed.

1: Adhesion of ink to cardboard was highly conspicuous.

Rating Method for Blocking Resistance

{1} Two sheets of the aforesaid ink-coated paper after drying were placed together with the coating sides facing inward and enclosing a glass plate, and a weight was placed thereon so as to produce a load of 10 g/cm² on a flat stand. After the paper was allowed to stand in constant temperature and constant humidity (25° C., 50%) for 24 hr, the state when the two sheets of paper were pulled apart was rated according to four ranks:

State of the printed surface (good) 4-3-2-1 (poor)

4: Hardly any damage to printed characters.

3: Slight agglomerative breakdown was observed in the ink on the separated sheets, and light force was required for the separation.

2: Clear agglomerative breakdown was observed in the ink on the separated sheets, and strong force was required for the separation.

1: Interfacial separation between the ink and the paper was observed during the separation.

TABLE a4

| | Ink abrasion resistance | Blocking resistance |
|---|---|---|
| Ink 1 | 4 | 4 |
| Ink 2 | 4 | 4 |
| Ink 3 | 4 | 4 |
| Ink 4 | 4 | 4 |
| Comparative Ink 5 | 3 | 3 |
| Comparative Ink 6 | 1 | 3 |
| Comparative Ink 7 | 4 | 3 |

Example b

Next, the present invention is explained in further detail based on the following examples, but the present invention is not in any way limited by these examples.

Measurement of characteristic values of each type was performed by the following methods.

1. State of dispersion of aqueous dispersion

Measured by passing liquid dispersion through 100 mesh metal gauze.

2. Particle diameter of aqueous dispersion (μm)

The 50% mean volume particle diameter was measured by Microtrac HRA particle analyzer (manufactured by Microtrac Corp.).

3. pH of aqueous dispersion

Measured using a pH meter (manufactured by Horiba).

4. Rating of abrasion resistance of water-based ink

Base material for printing water-based ink: K liner paper (manufactured by Oji Paper Co.)

White liner paper (manufactured by Settsu Co., Ltd.)

Water-based ink: prepared by blending water-based varnish (Joncryl 62: Johnson Polymer), a pigment liquid dispersion (WS RED R-1: manufactured by Toyo Ink) and binder (Joncryl 450) in the ratio of 20:40:40.

Rating method for abrasion resistance

{1} The aforesaid base material was coated with ink so as to have a dry film thickness of 3 to 4 μm.

{2} Allowed to stand and dried for 2 days at room temperature.

{3} JSPS (Japan Society for the Promotion of Science) Abrasion Resistance Tester Type II (Tester Sangyou K.K.) was used Friction paper: CRC cardboard Load, number of friction cycles: 200 g×500 times {4} Rating: ink-coated surface was rubbed with cardboard attached to the friction element, and the degree of transfer of ink to the cardboard was rated according to five ranks:

(good) 5-4-3-2-1 (poor)

Rating method for blocking resistance

{1} Two sheets of the aforesaid ink-coated paper after drying were placed together with the coating sides facing inward and enclosing a glass plate, and a weight was placed thereon so as to produce a load of 10 g/cm$^2$ on a flat stand. After the paper was allowed to stand in constant temperature and constant humidity (25° C., 50%) for 24 hr, the state when the two sheets of paper were pulled apart was rated according to four ranks:

State of the printed surface (good) 5-4-3-2-1 (poor)

Production Example b1

Production of Ethylene Polymer

A stainless-steel autoclave thoroughly flushed with nitrogen and having an interior volume of 2 l was charged with 950 ml of hexane and 50 ml of propene, and hydrogen was introduced until the pressure reached 1.0 kg/cm$^2$ (gauge pressure). Then, after the system temperature was raised to 150° C., polymerization was started by adding 0.3 mmol of triisobutyl aluminum, 0.004 mmol of triphenylcarbenium tetrakis(pentafluorophenyl) borate, and 0.02 mmol of (t-butylamide) dimethyl (tetramethyl-η$^5$-cyclopentadienyl) silane titanium dichloride (manufactured by Sigma-Aldrich Corp.) by pressure-injection with ethylene. Then, polymerization was carried out for 20 min at 150° C. while the entire pressure was maintained at 30 kg/cm$^2$ (gauge pressure) by continuous feeding of ethylene only. After the polymerization was halted by adding a small amount of ethanol to the system, the unreacted ethylene and propene were purged. The polymer solution obtained was dried overnight under reduced pressure at 100° C.

As a result, 32.5 g of an ethylene propene copolymer in which the Mn was 2050, the propene content was 7.3 mol %, the density was 920 kg/m$^3$, and the crystallization temperature was 93° C., was obtained, and was designated as WAX b1.

Production Example b2

Production of Ethylene Polymer

Polymerization was performed in the same way as in Production Example b1, except for the fact that the autoclave was charged with 935 ml of hexane and 65 ml of 1-butene as the α-olefin constituent, and hydrogen was introduced until the pressure reached 1.5 kg/cm$^2$ (gauge pressure).

As a result, 37.5 g of an ethylene.1-butene copolymer in which the Mn 1900, the 1-butene content was 5.6 mol %, the density was 920 kg/m$^3$, and the crystallization temperature was 93° C. was obtained (this copolymer was designated as WAX b2).

Production Example b3

Production of Ethylene Polymer

Polymerization was performed in the same way as in Production Example b1, except for the fact that 920 ml of hexane and 80 ml of 1-hexene as the α-olefin constituent were charged, and hydrogen was introduced until the pressure reached 2.0 kg/cm$^2$ (gauge pressure).

As a result, 43.2 g of an ethylene.1-hexene copolymer in which the Mn was 2100, the 1-hexene content was 3.4 mol %, the density was 917 kg/m$^3$, and the crystallization temperature was 93° C. was obtained (this copolymer was designated as WAX b3).

Production Example b4

Production of Ethylene Polymer

Polymerization was performed in the same way as in Production Example b1, except for the fact that 910 ml of hexane and 90 ml of 4-methyl-1-pentene as the α-olefin constituent were charged, and hydrogen was introduced until the pressure reached 2.0 kg/cm$^2$ (gauge pressure).

As a result, 41.2 g of an ethylene.4-methyl-1-pentene copolymer in which the Mn was 2000, the 4-methyl-1-pentene content was 3.7 mol %, the density was 918 kg/m$^3$, and the crystallization temperature was 93° C. was obtained (this copolymer was designated as WAX b4).

Production Example b5

Production of Ethylene Polymer

Polymerization was performed in the same way as in Production Example b1, except for the fact that 935 ml of hexane and 65 ml of 1-butene as the α-olefin constituent were charged, and hydrogen was introduced until the pressure reached 3.5 kg/cm$^2$ (gauge pressure).

As a result, 31.2 g of an ethylene.1-butene copolymer in which the Mn was 600, the 1-butene content was 5.2 mol %, the density was 920 kg/M$^3$, and the crystallization temperature was 92° C. was obtained (this copolymer was designated as WAX b5).

Production Example b6

Production of Ethylene Polymer

Polymerization was performed in the same way as in Production Example b1, except for the fact that 935 ml of hexane and 65 ml of 1-hexene as the α-olefin constituent were charged, and hydrogen was introduced until the pressure reached 1.0 kg/cm$^2$ (gauge pressure).

As a result, 38.8 g of an ethylene.1-butene copolymer in which the Mn was 4000, the 1-butene content was 5.7 mol %, the density was 920 kg/m$^3$, and the crystallization temperature was 92° C. was obtained (this copolymer was designated as WAX b6).

Production Example b7

Production of Ethylene Polymer

Polymerization was performed in the same way as in Production Example b1, except for the fact that no propene was charged, 935 ml of hexane was charged, and hydrogen were introduced until the pressure reached 1.0 kg/cm$^2$ (gauge pressure).

As a result, 38.8 g of an ethylene polymer in which the Mn was 2000, the density 977 was kg/m$^3$, and the crystallization temperature was 110° C. was obtained (this was designated as WAX b7).

Comparative Production Example b1

Preparation of the Catalyst 25 g of commercially available sold anhydrous magnesium hydrochloride was suspended in 500 ml of hexane in a 1.5 l glass autoclave. While this was agitated and maintained at 30° C., 92 ml of ethanol was added by dripping over 1 hr, and the reaction further continued for 1 hr. After the completion of the reaction, 93 ml of dimethyl aluminum monochloride was added by dripping over 1 hr, and the reaction further continued for 1 hr. After the completion of the reaction, 90 ml of titanium tetrachloride was added by dripping, the reaction vessel was heated to 80° C., and the reaction was performed for 1 hr.

After the completion of the reaction, the solid fraction was washed with hexane until free titanium could no longer be detected by decantation. A hexane liquid suspension was prepared from the solid fraction, the titanium concentration was determined by titration, and the substance was used in the following experiments.

Production of Ethylene Polymer

A stainless-steel autoclave thoroughly flushed with nitrogen and having an interior volume of 2 l was charged with 930 ml of hexane and 70 ml of 1-butene, and hydrogen was introduced until the pressure reached 20.0 kg/cm$^2$ (gauge pressure). Next, after the system temperature was raised to 170° C., polymerization was started by adding 0.1 mmol of triethyl aluminum, 0.4 mmol of ethyl aluminum sesquichloride, and 0.008 mmol (amount of titanium atom) of the titanium constituent obtained as described above by atomic conversion by pressure-injection with ethylene. Then, polymerization was carried out for 40 min at 170° C. while the entire pressure was maintained at 40 kg/cm$^2$ (gauge pressure) by continuous feeding of ethylene only.

After the polymerization was halted by adding a small amount of ethanol to the system, the unreacted ethylene and 1-butene were purged. The polymer solution obtained was dried overnight under reduced pressure at 100° C.

As a result, 129 g of an ethylene.1-butene copolymer in which the Mn was 2000, the 1-butene content was 5.4 mol %, the density was 917 kg/m$^3$, and the crystallization temperature was 101° C., was obtained (this copolymer was designated as WAX b8).

Comparative Production Example b2

Production of Ethylene Polymer

Polymerization was performed in the same way as in Comparative Production Example b1, except for the fact that 850 ml of hexane and 150 ml of 4-methyl-1-pentene as the α-olefin constituent were charged, and hydrogen was introduced until the pressure reached 21.0 kg/cm$^2$ (gauge pressure).

As a result, 99 g of an ethylene.4-methyl-1-pentene copolymer, in which the Mn was 2100, the 4-methyl-1-pentene content was 3.7 mol %, the density was 919 kg/m$^3$, and the crystallization temperature was 105° C., was obtained (this copolymer was designated as WAX b9).

Comparative Production Example b3

Production of Ethylene Polymer

Polymerization was performed in the same way as in Comparative Production Example b1, except for the fact that no propene was charged, 1000 ml of hexane was charged and hydrogen were introduced until the pressure reached 2.5 kg/cm$^2$ (gauge pressure).

As a result, 34.4 g of an ethylene polymer, in which the Mn was 2000, the density was 977 kg/m$^3$, and the crystallization temperature was 126° C., was obtained (this copolymer was designated as WAX b10).

Comparative Production Example b4

Production of Ethylene Polymer

Polymerization was performed in the same way as in Comparative Production Example b1, except for the fact that 920 ml of hexane and 80 ml of propene were introduced.

As a result, 29.9 g of an ethylene propene copolymer, in which the Mn was 1800, the propene content was 11.2 mol %, the density was 897 kg/m$^3$, and the crystallization temperature was 81° C., was obtained (this copolymer was designated as WAX b11).

TABLE b1

|  | α-olefin type | α-olefin content (mol %) | Number-average molecular wt (Mn) | Density (D) (kg/m$^3$) | Left side of formula (II) | Crystallization temperature (Tc) (° C.) |  |
|---|---|---|---|---|---|---|---|
| WAXb1 | Propene | 7.3 | 2050 | 920 | 94.9 | 93 | Production Ex. b1 |
| WAXb2 | 1-butene | 5.6 | 1900 | 920 | 94.9 | 93 | Production Ex. b2 |
| WAXb3 | 1-hexene | 3.4 | 2100 | 917 | 93.5 | 93 | Production Ex. b3 |
| WAXb4 | 4-methyl-1-pentene | 3.7 | 2000 | 918 | 93.9 | 93 | Production Ex. b4 |
| WAXb5 | 1-butene | 5.2 | 600 | 920 | 94.9 | 92 | Production Ex. b5 |
| WAXb6 | 1-butene | 5.7 | 4000 | 920 | 94.9 | 92 | Production Ex. b6 |
| WAXb7 | None | 0 | 2000 | 977 | 123 | 110 | Production Ex. b7 |
| WAXb8 | 1-butene | 5.4 | 2000 | 917 | 93.5 | 101 | Comp. Prod. Ex. b1 |
| WAXb9 | 4-methyl-1-pentene | 3.7 | 2100 | 919 | 94.4 | 105 | Comp. Prod. Ex. b2 |
| WAXb10 | None | 0 | 2000 | 977 | 124.9 | 126 | Comp. Prod. Ex. b3 |

TABLE b1-continued

|  | α-olefin type | α-olefin content (mol %) | Number-average molecular wt (Mn) | Density (D) (kg/m³) | Left side of formula (II) | Crystallization temperature (Tc) (° C.) | |
|---|---|---|---|---|---|---|---|
| WAXb11 | Propene | 11.2 | 1800 | 897 | 83.4 | 81 | Comp. Prod. Ex. b4 |

Production Example b8

Production of Modified Ethylene Copolymer

A 300 cc glass vessel equipped with an agitator was charged with 150 g of linear polyethylene wax having a molecular weight of 2200, a density of 0.92 g/cm³, 0.5 internal double bonds per 1000 carbon atoms, and a molten viscosity of 60 cP (160° C.), and after heating and melting with an oil bath, nitrogen flushing was performed by blowing nitrogen gas at 150° C. from the bottom of the glass vessel at a flow rate of about 40 l/hr for 30 min. Next, 25 g of maleic anhydride in a molten state and 5 g of benzoyl peroxide were added by dripping over 2 hr, and the reaction was carried out at 150° C. for 1 hr. After the reaction was completed, unreacted volatile constituents such as maleic anhydride and benzoyl peroxide decomposition products were removed by maintaining the interior of the vessel at a reduced pressure of 5 mm Hg under agitation for 1 hr. Then a maleic anhydride modified polyethylene which had been produced was removed from the vessel.

As a result, a maleic-anhydride-modified polyethylene, having an acid value of 60 mg KOH/g, an intrinsic viscosity [η] of 0.17 dl/g and a melting point of 110° C., was obtained (this modified polymer was designated as Modified WAX b1).

Production Example b9

Production of Modified Ethylene Copolymer

A 500 ml nitrogen-purged-round-bottom flask equipped with a condenser, an air agitator and a temperature gauge was charged with 10 g of polyethylene oligomer ([η]: 0.11 dl/g, Mn: 900, Ma/Mn: 1.9, number of vinyl groups per 1000 carbons: 14.6) which was prepared by the method described in Synthesis Example 1 of JPA [Kokai] 2001-2731 and 100 ml of n-decane. The charged contents were agitated and heated to 100° C. to dissolve the polymer. After cooling to 35° C., 5.1 ml of acetic anhydride was added, and then 2 ml of sulfuric acid was added. This reaction mixture was agitated and held at 35° C. for 15 min. Then 2.5 ml of additional acetic anhydride and 1 ml of additional sulfuric acid were added. Agitation of this reaction mixture was continued for a total of 1 hr at 35° C. Next, 4 ml of methanol and 0.42 g of NaOH dissolved in 2 ml water were added, along with 1 ml of methanol. Next, this reaction mixture was allowed to stand overnight, then subjected to steam stripping, held overnight in a hood, and after separation by filtration, vacuum-dried to a specific weight. The sulfonating agent (and neutralizer) used in this example was used in substantial excess in order to ensure a complete sulfonation.

As a result, a sulfonic acid-modified polyethylene, which was a modified wax having modification amount of 1 mmol/g, and had an intrinsic viscosity [η] of 0.12 dl/g and a melting point of 120° C., was obtained (this modified polymer was designated as Modified WAX b2).

TABLE b2

|  | Modification type | Modification amount | [η] (dl/g) | Melting point (° C.) | |
|---|---|---|---|---|---|
| Modified WAX b1 | Maleic anhydride | Acid value = 60 mg KOH/g | 0.17 | 110 | Production Example b8 |
| Modified WAX b2 | —SO₃— | 1 mmol/g-modified wax | 0.12 | 120 | Production Example b9 |

Synthesis Example b1

A 1-liter autoclave equipped with an agitation blade was charged with 60 g of WAX b1 and 140 grams of modified WAX b1, and melt-blending was performed at 140° C. After blending, heating was continued for 1 hr, while at the same time nitrogen was bubbled in at a flow rate of 10 l/hr, and a molten blend was obtained. The amount of the components that were volatile at 150° C. was 0.12% of the molten blend obtained.

Next, 1500 ml of water and 8.4 g of potassium hydroxide were introduced into a pressure-resistant homomixer having an interior volume of 4 l, and while this was heated to 140° C. and agitated at 5000 rpm, the molten mixture obtained above was added by a gear pump over 1 hr. Then, after agitation for another 15 min, the mixture was cooled to room temperature and an aqueous dispersion liquid was obtained.

The dispersed particles in the aqueous dispersion liquid obtained were spherical, and the average particle diameter was found to be 0.6 μm as a result of a particle size measurement. No separation occurred in this aqueous dispersion liquid even after it was allowed to stand for 1 week.

Synthesis Examples b2 through b8

Except for the fact that the WAX and the Modified WAX as indicated in Table b3 were used, aqueous dispersion liquids were obtained by the same method in Synthesis Example b1. The properties of the aqueous liquid dispersions obtained are described in Table b3.

Comparative Synthesis Examples b1 through b5

Except for the fact that the WAX and the Modified WAX were used as indicated in Table b3, and the rotational speed of the pressure-resistant homomixer was set to the value shown in Table b3, aqueous dispersion liquids were obtained by the same method as used in Synthesis Example b1. The properties of the aqueous liquid dispersions obtained are described in Table b3.

tion was performed in same way as in Example b1, and the abrasion resistance was evaluated. The results are shown in Table b4.

Comparative Examples b1 through b6

Except for the fact that the aqueous dispersions and base material used were changed as shown in Table b4, evaluation was performed in same way as in Example b1, and the abrasion resistance was evaluated. The results are shown in Table b4.

TABLE b3

| | Synthesis examples | | | | | | | | Comparative synthesis examples | | | | |
|---|---|---|---|---|---|---|---|---|---|---|---|---|---|
| | b1 | b2 | b3 | b4 | b5 | b6 | b7 | b8 | b1 | b2 | b3 | b4 | b5 |
| Ethylene-based polymer (g) | | | | | | | | | | | | | |
| WAXb1 | 60 | 60 | — | — | — | — | — | — | — | — | — | — | — |
| WAXb2 | — | — | 60 | — | — | — | — | — | — | — | — | — | — |
| WAXb3 | — | — | — | 60 | — | — | — | — | — | — | — | — | — |
| WAXb4 | — | — | — | — | 60 | — | — | — | — | — | — | — | — |
| WAXb5 | — | — | — | — | — | 60 | — | — | — | — | — | — | — |
| WAXb6 | — | — | — | — | — | — | 60 | — | — | — | — | — | — |
| WAXb7 | — | — | — | — | — | — | — | 60 | — | — | — | — | — |
| WAXb8 | — | — | — | — | — | — | — | — | — | 60 | — | — | — |
| WAXb9 | — | — | — | — | — | — | — | — | — | — | 60 | — | — |
| WAXb10 | — | — | — | — | — | — | — | — | — | — | — | 60 | — |
| WAXb11 | — | — | — | — | — | — | — | — | — | — | — | — | 60 |
| Modified ethylene polymer (g) | | | | | | | | | | | | | |
| Modified WAXb1 | 140 | — | 140 | 140 | 140 | 140 | 140 | 140 | 140 | 140 | 140 | 140 | 140 |
| Modified WAXb2 | — | 140 | — | — | — | — | — | — | — | — | — | — | — |
| Pressure-resistant homomixer speed (rpm) | 5000 | 5000 | 5000 | 5000 | 5000 | 5000 | 5000 | 5000 | 5000 | 5000 | 5000 | 5000 | 5000 |
| Amount of water added (ml) | 1500 | 1500 | 1500 | 1500 | 1500 | 1500 | 1500 | 1500 | 1500 | 1500 | 1500 | 1500 | 1500 |
| Potassium hydroxide (g) | 8.4 | 8.4 | 8.4 | 8.4 | 8.4 | 8.4 | 8.4 | 8.4 | 8.4 | 8.4 | 8.4 | 8.4 | 8.4 |
| Volume-average particle diameter of aqueous dispersion ($\mu$m) | 0.6 | 0.4 | 0.6 | 0.6 | 0.3 | 3.1 | 0.7 | 0.6 | 35 | 40 | 0.6 | 0.3 | 0.3 |

Example b1

The aqueous dispersion synthesized in Synthesis Example b1 was added to the aforementioned water-based ink in an amount of 1% (by solid content ratio) of the ink, and agitated to form a sample. The sample was coated on a K liner, and after drying for 2 days at room temperature, abrasion resistance was evaluated in accordance with the abrasion resistance rating method described above. The results are shown in Table b4.

Example b2

Except for the fact that the drying conditions were changed to 120° C. and 20 min, evaluation was performed in same way as in Example b1, and the abrasion resistance was evaluated. The results are shown in Table b4.

Examples b3 through b11

Except for the fact that the aqueous dispersions and base material used were changed as shown in Table b4, evalua- TABLE b4

| Aqueous dispersion | | Particle diameter (μm) | Base material | Drying conditions | Abrasion resistance | Blocking resistance |
|---|---|---|---|---|---|---|
| Example b1 | Synthesis Example b1 | 0.6 | K liner | Room temperature | 4–5 | 5 |
| Example b2 | Synthesis Example b1 | 0.6 | K liner | 120° C. | 4–5 | 5 |
| Example b3 | Synthesis Example b1 | 0.6 | White liner | Room temperature | 4–5 | 5 |
| Example b4 | Synthesis Example b1 | 0.6 | White liner | 120° C. | 4–5 | 5 |
| Example b5 | Synthesis Example b2 | 0.4 | K liner | Room temperature | 4–5 | 5 |
| Example b6 | Synthesis Example b3 | 0.6 | K liner | Room temperature | 4–5 | 5 |
| Example b7 | Synthesis Example b4 | 0.6 | K liner | Room temperature | 4–5 | 5 |
| Example b8 | Synthesis Example b5 | 0.3 | K liner | Room temperature | 4–5 | 5 |
| Example b9 | Synthesis Example b6 | 3.1 | K liner | Room temperature | 4–5 | 5 |
| Example b10 | Synthesis Example b7 | 0.7 | K liner | Room temperature | 5 | 5 |
| Example b11 | Synthesis Example b8 | 0.6 | K liner | Room temperature | 4–5 | 5 |
| Comp. Working Example b1 | Comp. Syn. Example b1 | 35 | K liner | Room temperature | 1 | 2 |
| Comp. Working Example b2 | Comp. Syn. Example b2 | 40 | K liner | Room temperature | 1 | 2 |
| Comp. Working Example b3 | Comp. Syn. Example b3 | 0.6 | K liner | Room temperature | 4 | 4 |
| Comp. Working Example b4 | Comp. Syn. Example b3 | 0.6 | K liner | 120° C. | 4 | 4 |
| Comp. Working Example b5 | Comp. Syn. Example b4 | 0.3 | K liner | Room temperature | 3 | 4 |
| Comp. Working Example b6 | Comp. Syn. Example b5 | 0.3 | K liner | Room temperature | 4 | 2 |

Synthesis Example b9

Production of Organic Solvent Dispersion

The aqueous dispersion obtained in Synthesis Example b1 was diluted with distilled water until the solid concentration reached 10 wt % and used as a raw material. 200 g of this raw material was placed in a 500 cc beaker equipped with agitator blades. During the following operation, "parts" means the weight parts of additive based on 100 weight parts of the solid component in the raw material.

0.5 parts of surfactant (polyoxyethylene-nonylphenyl ether, HLB: 7.8) was added to this raw material, and agitated for 10 min at 500 rpm. Then, 40 parts of 0.1 N sulfuric acid was added to the raw material, which was then neutralized by agitation at 500 rpm for 10 min. The polymer fine particles were aggregated by this neutralization. Next, the aggregated polymer fine particles were suction-filtered using a paper filter to remove the greater portion of the water, and then a wet cake was obtained.

500 parts of isopropyl alcohol was added to this wet cake and after washing by agitation on a filter, suction filtration was again performed and a wet cake was obtained. This wet cake was placed in a beaker containing 120 parts n-decane and agitated at 500 rpm for 30 min, then an organic solvent dispersion in which the polymer particles were dispersed in n-decane was obtained.

When the dispersion obtained was analyzed, it was found to have a water content of 0.5 wt %, a solid content of 44 wt %, an average diffusion particle diameter of 4 μm, and the residue after passing through 100 mesh metal gauze was 0.5 wt % of the solid constituent.

I claim:

1. A polyolefin wax (B) for a coating material comprising an ethylene (co)polymer (A) having a number average molecular weight (Mn) within the range of from 400 to 5000 as measured by gel permeation chromatography (GPC), said polyolefin wax having a mean volume particle diameter in the range of from 0.3 μm to 20 μm wherein the relation between a particle diameter a (μm), in which the weight ratio of the larger particle diameter side in weight particle size distribution is 10%, and a particle diameter b (μm), in which the weight ratio of the smaller particle diameter side in weight particle size distribution is 10%, satisfies the following equation (I):

$$a/b \leq 4 \tag{I}$$

and the relation between the crystallization temperature Tc (° C.) of the ethylene (co)polymer (A), measured at a cooling rate of 2° C./min as measured by differential scanning calorimetry (DSC) and the density D (kg/m³) of the ethylene (co)polymer (A) as measured by the density gradient tube method satisfies the following equation (II):

$$0.501 \times D - 366 \geq Tc \tag{II}$$

2. The polyolefin wax (B) for a coating material according to claim 1, wherein said ethylene (co)polymer (A) is an ethylene/α-olefin copolymer obtained from ethylene and at least one of propene and 1-butene, and the density of (A) is in the range of from 850 kg/m³ to 980 kg/m³.

3. The polyolefin wax (B) for a coating material according to claim 1, wherein said ethylene (co)polymer (A) is prepared using a vanadium catalyst or a metallocene catalyst.

4. A printing ink composition comprising from 0.1 to 10 weight % of the polyolefin wax (B) for a coating material according to claim 1.

* * * * *